United States Patent
Immel

(10) Patent No.: US 7,165,408 B2
(45) Date of Patent: Jan. 23, 2007

(54) METHOD OF OPERATING A CRYOGENIC LIQUID GAS STORAGE TANK

(75) Inventor: Rainer Immel, Dexheim (DE)

(73) Assignee: General Motors Corporation, Detroit, MI (US)

( * ) Notice: Subject to any disclaimer, the term of this patent is extended or adjusted under 35 U.S.C. 154(b) by 326 days.

(21) Appl. No.: 10/782,159

(22) Filed: Feb. 19, 2004

(65) Prior Publication Data

US 2005/0183425 A1    Aug. 25, 2005

(51) Int. Cl.
*F17C 3/08* (2006.01)
*F17C 7/04* (2006.01)
*F17C 9/02* (2006.01)
*F17C 7/02* (2006.01)
*B65B 1/20* (2006.01)
*B65B 3/22* (2006.01)
*F04B 19/24* (2006.01)
*F04B 1/18* (2006.01)

(52) U.S. Cl. ............... 62/45.1; 62/48.1; 62/50.1; 417/207; 141/82

(58) Field of Classification Search ............. 62/45.1, 62/48.1, 50.1, 50.2; 141/11, 82; 417/207, 417/208, 63; 60/259, 260
See application file for complete search history.

(56) References Cited

U.S. PATENT DOCUMENTS

| | | | | |
|---|---|---|---|---|
| 3,304,729 A | * | 2/1967 | Chandler et al. | 62/48.3 |
| 4,364,235 A | * | 12/1982 | Hemmerich | 62/55.5 |
| 4,625,521 A | * | 12/1986 | Murphy et al. | 62/55.5 |
| 4,805,804 A | * | 2/1989 | Raczkowski | 222/54 |
| 4,877,153 A | * | 10/1989 | Varghese et al. | 220/560.1 |
| 4,988,014 A | * | 1/1991 | Varghese et al. | 62/45.1 |
| 5,226,299 A | * | 7/1993 | Moiseev | 62/45.1 |
| 6,688,115 B1 | * | 2/2004 | Gershtein | 62/54.1 |

* cited by examiner

Primary Examiner—William C. Doerrler
(74) Attorney, Agent, or Firm—Harness, Dickey & Pierce, P.L.C.

(57) ABSTRACT

The present invention teaches methods of operating a pressurized cryogenic liquid gas storage tank that has a vent cooling shield around which fuel vented from a storage tank flows to cool the storage tank by reducing the influence of heat influx into the storage tank. The method of the present invention provides for reduction in the quantity of fuel loss during the venting operation and allows a greater volume of liquid fuel to be stored in the storage tank. The method includes allowing fuel in a storage tank to transition between a two-phase state of liquid and gas into a single-phase state of liquid and back into a two-phase state of liquid and gas. Additionally, the present invention allows filling a storage tank to a liquid level greater than about 95% of the capacity of the storage tank.

25 Claims, 7 Drawing Sheets

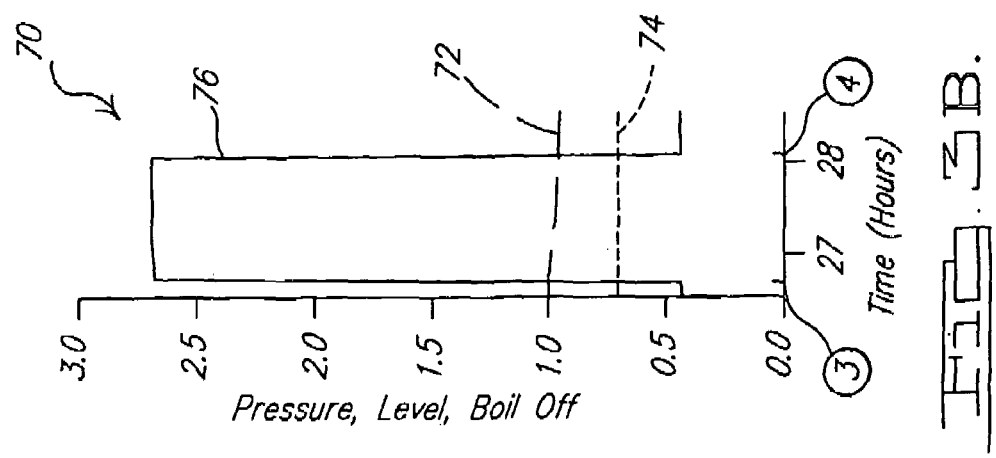
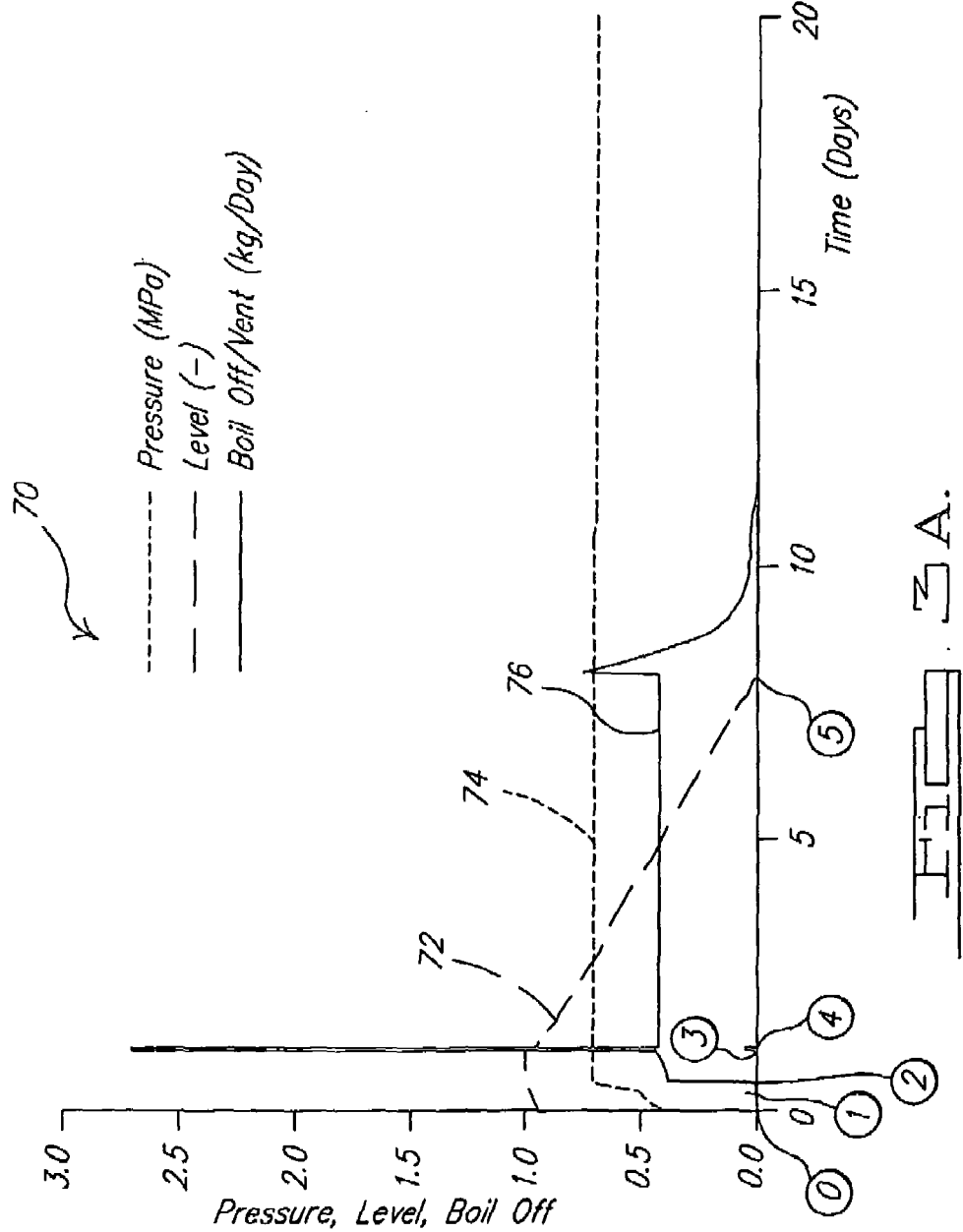

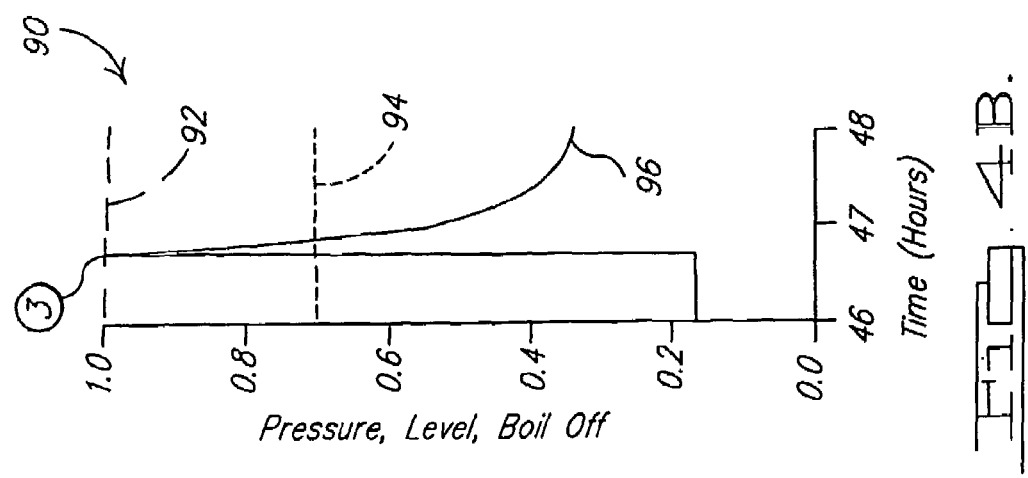
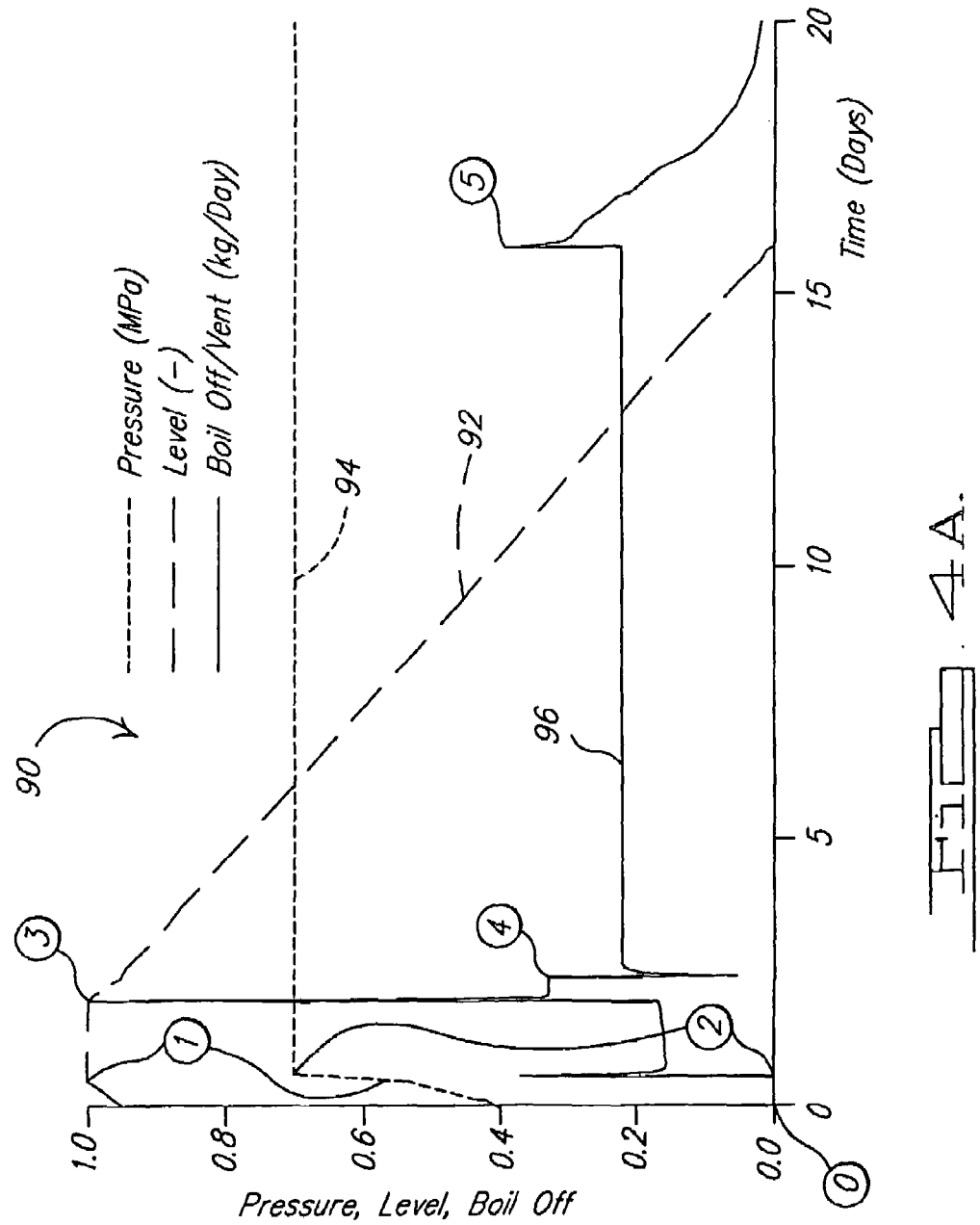

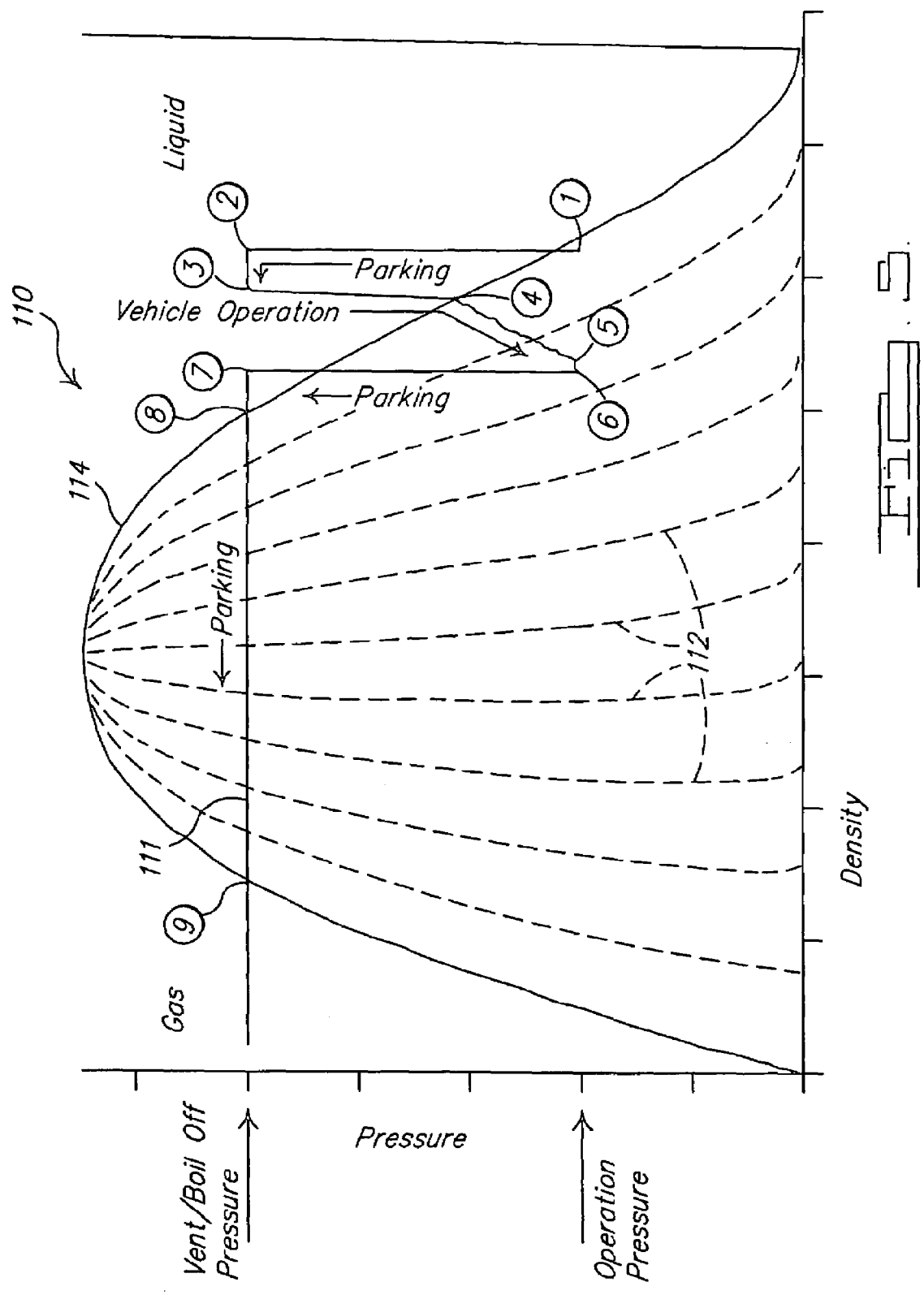

METHOD OF OPERATING A CRYOGENIC LIQUID GAS STORAGE TANK

FIELD OF THE INVENTION

The present invention relates to liquid gas storage tanks and more particularly to methods of operating a cryogenic liquid gas storage tank.

BACKGROUND OF THE INVENTION

With the changing emissions requirements for mobile platforms or vehicles (e.g., automobiles, buses, trucks, etc.) alternative drive, such as fuel cell systems, and/or fuels, such as hydrogen, liquid natural gas, and propane are being implemented on the mobile platforms. The space available for storing fuel on these mobile platforms, however, may be limited. Thus, it is advantageous to maximize the storage capacity of a storage tank for these alternate fuels on the mobile platform.

To provide efficient storage of these alternate fuels, the fuels are stored in storage tanks at very low temperatures, such as 20 to 100° K., and at elevated pressures, such as 1–12 bars, to densify the fuel and thereby provide more of the fuel in a given volume of space. Such tanks are typically considered cryogenic storage tanks and may include a multi-layered vacuum super insulated cryogenic tank. The fuel stored in the storage tanks is typically maintained in a two-phase state of liquid and gas. As the fuel is stored, heat influx into the storage tank causes the temperature of the fuel to increase which also causes the pressure in the storage tank to increase. A pressure relief valve or vent valve is utilized on these tanks to vent the fuel from the tank when the pressure has risen to a predetermined level. The valves function to prevent the pressure within the storage tanks from exceeding that predetermined value.

The venting of the fuel is a loss of energy and, accordingly, increases the cost of operating the mobile platform on which the storage tank is utilized. Additionally, to avoid venting liquid fuel from the storage tank the tanks are operated in a manner that limits the liquid level of the fuel in the tank at all times to a maximum of 95% of the capacity of the tank. The vent valve draw off location from the storage is typically arranged at the 95% or higher level of the storage tank so that liquid fuel is not vented from the storage tank during a venting operation. Because the fuel is stored in a two-phase state of liquid and gas, at least the top 5% of the tank will contain the fuel in a gaseous state. The maintaining of at least 5% of the fuel in a gaseous state, however, does not maximize the capacity of the storage tank due to the lower density of the gas than the liquid fuel. Accordingly, it would be advantageous to utilize the entire capacity of the storage tank. Additionally, it would be advantageous to minimize the quantity of fuel vented from the tank during a venting operation while the fuel is being stored.

SUMMARY OF THE INVENTION

The present invention provides methods of operating a pressurized cryogenic liquid gas storage tank that has a vent cooling shield around or along which fuel vented from the storage tank flows to cool the storage tank and reduce the influence of heat influx into the storage tank. The methods of the present invention take advantage of the benefits of the vent cooling shield to provide an operation of the storage tanks that reduces the quantity of fuel lost during a venting operation and allows a greater volume of liquid fuel to be stored in the storage tanks.

In a first aspect, according to the principles of the present invention, a method is disclosed for operating a system which includes a pressurized cryogenic storage tank for storing a gaseous fuel in liquid form and which includes an apparatus that consumes fuel from the storage tank. The method includes: (1) storing the fuel in the storage tank in a first two-phase gas and liquid state; (2) transitioning the fuel in the storage tank from the first two-phase state to a single-phase liquid state by heat influx into the storage tank; and (3) transitioning the fuel in the storage tank from the single-phase liquid state to a second two-phase gas and liquid state.

In a second aspect, according to the principles of the present invention, a method is disclosed for operating a system which includes a pressurized cryogenic storage tank for storing hydrogen in liquid form and which has a vent cooling shield and which includes an apparatus that consumes hydrogen from the storage tank. The method includes: (1) adding hydrogen to the storage tank so that the storage tank is filled with hydrogen in a first two-phase gas and liquid state with a liquid level greater than about 95% of a capacity of the storage tank; (2) transitioning the fuel in the storage tank from the first two-phase gas and liquid state to a first single-phase liquid state; and (3) transitioning the fuel in the storage tank from the first single-phase liquid state to a second two-phase gas and liquid state.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3A is a diagram of operation of a pressurized cryogenic storage tank without a cooling shield when storing hydrogen above 95% filling level and venting liquid hydrogen from the storage tank;

FIG. 3B is an enlarged view of the diagram of FIG. 3A around states 3 and 4;

FIG. 4A is a diagram of operation according to the methods of the present invention of a pressurized cryogenic liquid gas storage tank with a cooling shield when storing hydrogen and venting liquid hydrogen from the storage tank;

FIG. 4B is an enlarged view of the diagram of FIG. 4A around state 3;

FIG. 5 is a phase diagram of the state of hydrogen fuel in a storage tank being operated as shown in FIG. 4A with the addition of the mobile platform consuming a portion of the hydrogen fuel during a portion of the storing of the hydrogen in the storage tank.

DETAILED DESCRIPTION OF THE PREFERRED EMBODIMENT

The following description of the preferred embodiment is merely exemplary in nature and is in no way intended to limit the invention, its application, or uses.

Figure 1A:
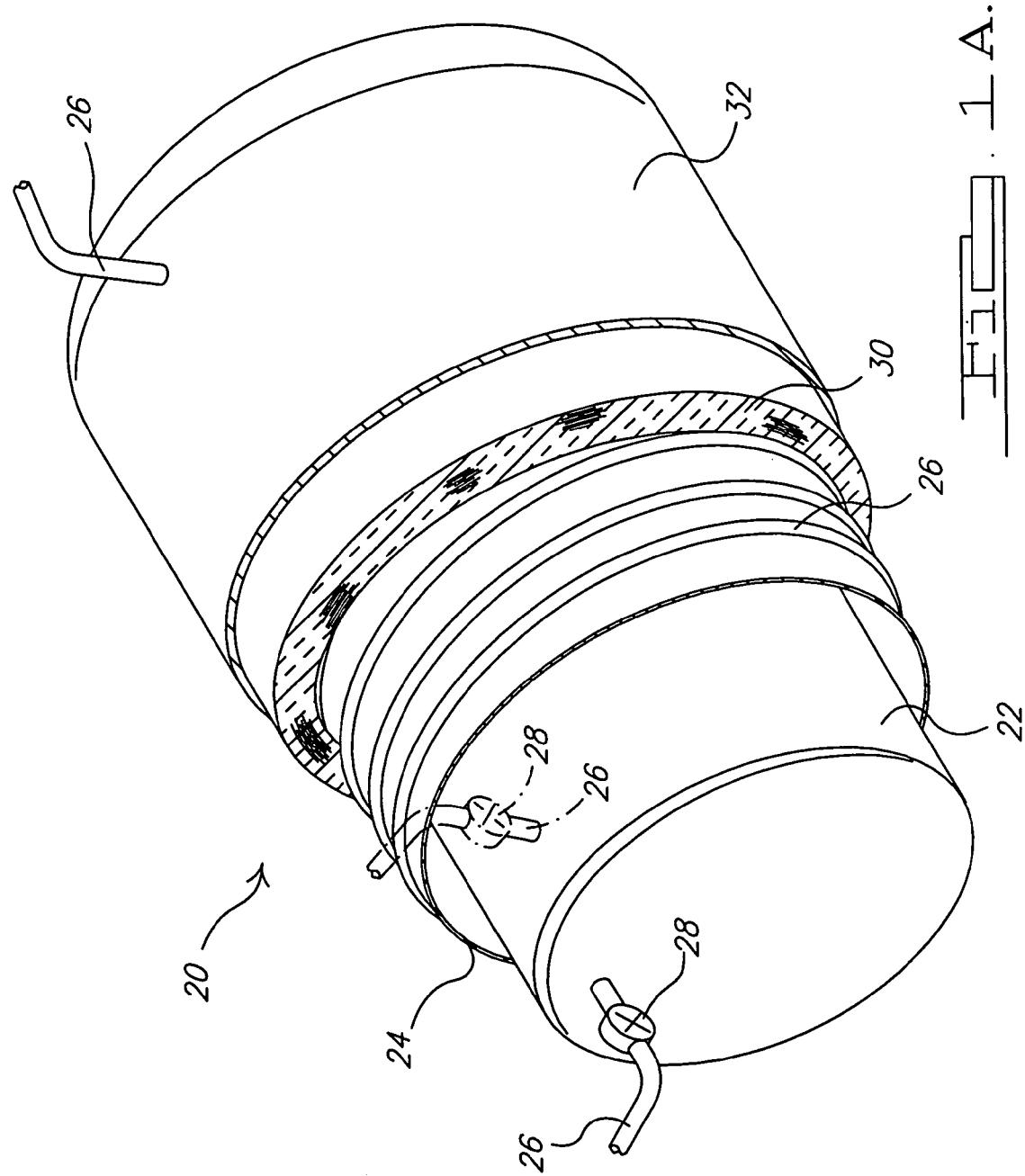
FIG. 1A is a simplified cut-away representation of a pressurized cryogenic liquid gas storage tank with a vent cooling shield with which the methods of the present invention can be utilized.

FIGS. 1A and B show a typical multi-layered vacuum super insulated cryogenic liquid gas storage tank 20 with which the methods of the present invention can be utilized. Storage tank 20 includes an inner tank 22 which is partially surrounded by a vent or boil-off cooling shield 24. A vent or boil-off line 26 is connected to inner tank 22. Vent line 26 includes a valve 28 that is operable to open and close vent line 26 to respectively allow and inhibit flow through vent line 26. Vent valve 28 can be a pressure relief valve that opens automatically when a predetermined pressure is reached in inner tank 22. Vent line 26 spirals around cooling shield 24 in direct contact with cooling shield 24 so that fluid flowing through vent line 26 cools cooling shield 24 prior to exiting storage tank 20. Inner tank 22 and cooling shield 24 are surrounded by multiple layers of radiant heat shielding or insulation 30. An outer tank 32 encases insulation 30, valve 28, vent line 26, cooling shield 24, and inner tank 22. There is a vacuum between inner tank 22 and outer tank 32. The vacuum is about $10^{-4}$ mbar which is also referred to as an ultra-high vacuum. The insulation 30 in conjunction with the ultra-high vacuum provides a multi-layer vacuum super insulation or MLVSI between inner and outer tanks 22 and 32.

Other components (not shown) include conduits for filling and emptying inner tank 22 as well as electrical leads for sensors and the like. These other components are welded to inner tank 22 and outer tank 32 to provide fluid tight seals so that the ultra-high vacuum can be created between inner and outer tanks 22, 32. These other components are similar to and attached in a similar manner to inner and outer tanks 22, 32 as is conventionally known.

Inner tank 22 is designed to store a fluid at cryogenic temperatures of less than 100° K. Preferably, inner tank 22 is capable of storing fluids at less than 30° K. Inner tank 22 stores the fluid at a pressure in the range of about 1–12 bars. Preferably, inner tank 22 stores the fluid at about 4 bars. To meet these functional requirements inner tank 22 can be made from a variety of materials that are capable of withstanding the cryogenic temperatures experienced and the pressure differentials between the interior of inner tank 22 and the ultra-high vacuum between inner tank 22 and outer tank 32. Preferably, inner tank 22 is made from a metal, such as stainless steel, aluminum or an alloy of aluminum. The use of metal facilitates the sealing of the other components to inner tank 22. For example, the other components can be sealed to inner tank 22 by welding.

Insulation 30 in conjunction with the ultra-high vacuum provides a multi-layered vacuum super insulation, as is known in the art. Insulation 30 consists of a large number, approximately 30–80, of reflective foil thermal radiation shields, preferably made of aluminum, which are coiled or wrapped around cooling shield 24. That is, because the primary cause of heat gain in inner tank 22 is due to thermal radiation, insulation 30 provides multiple layers of thermal radiation shielding to inhibit the influx of heat via radiation into inner tank 22.

Outer tank 32 provides a protective casing for storage tank 20 and also provides a fluid-tight seal so that the ultra-high vacuum can be created between inner and outer tanks 22 and 32. Outer tank 32 is configured to withstand the pressure differential between the ultra-high vacuum between inner and outer tanks 22 and 32 and the pressure of the environment within which storage tank 20 is located. To meet these requirements, outer tank 32 can be made from a variety of materials. Preferably, outer tank 32 is metallic and made from the same material as inner tank 22. Specifically, outer tank 32 is preferably made from stainless steel, aluminum, or an alloy of aluminum. By making inner and outer tank 22 and 32 of the same material, the welding of the other components to inner and outer tanks 22 and 32 is simplified.

Figure 1B:
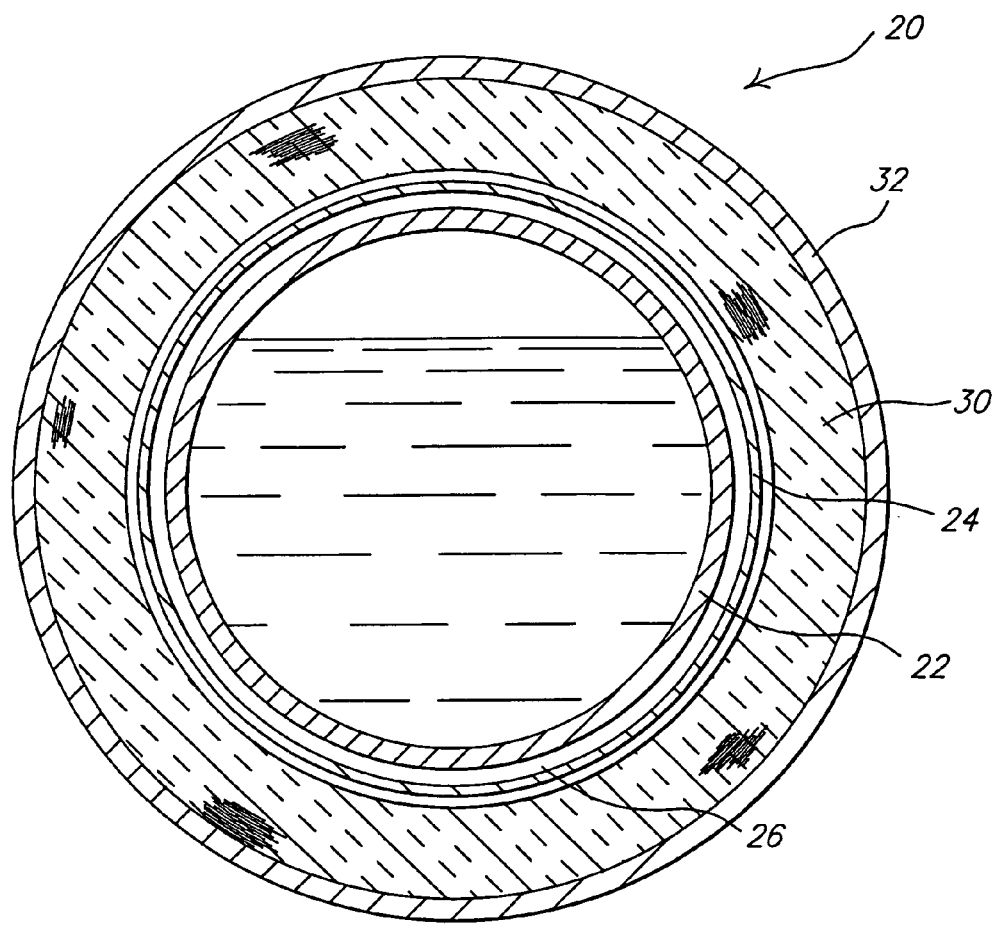
FIG. 1B is a simplified cross-sectional representation of the storage tank of FIG. 1A along line B—B.
Figure 1C:
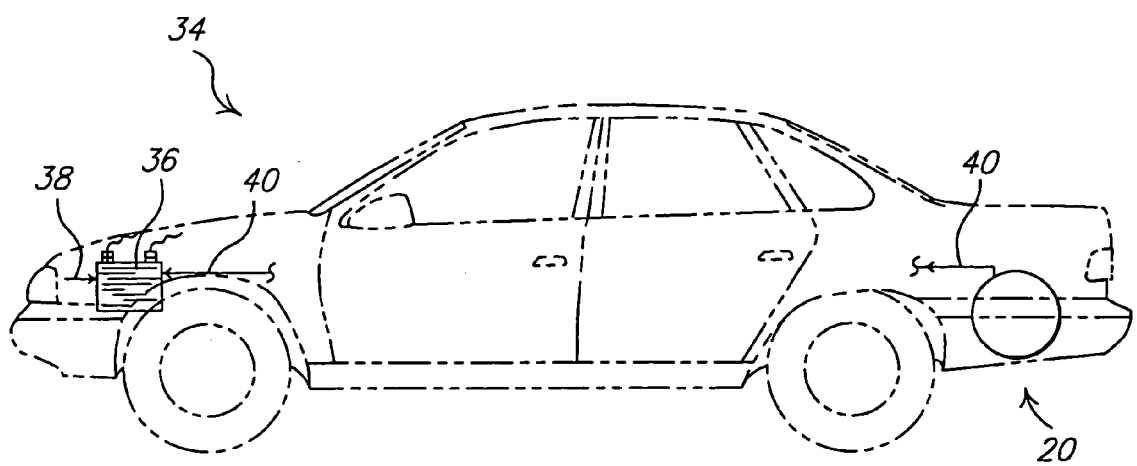
FIG. 1C is a simplified representation of a mobile platform having the storage tank of FIG. 1A.

Referring now to FIG. 1C, storage tank 20 is configured to fit on a mobile platform 34. Mobile platform 34 can come in a variety of configurations, such as an automobile, as shown, a bus, a truck, and the like. There is a fuel cell system or an internal combustion engine 36 contained on mobile platform 34. Fuel cell system 36 utilizes an oxygen containing stream 38 and a hydrogen containing stream 40 to produce electrical power to drive mobile platform 34. Oxygen containing stream 38 can be drawn from the air or from a stored oxygen source. Storage tank 20 is used to supply hydrogen to fuel cell system 36. That is, storage tank 20 is designed to contain hydrogen within inner tank 22 that is selectively supplied to fuel cell system 36 as needed as hydrogen containing stream 40. Fuel cell system 36 then consumes the hydrogen in storage tank 20 along with the oxygen in oxygen containing stream 38 to produce electrical power for mobile platform 34. Accordingly, there is a supply line from storage tank 20 to fuel cell system 36 that enables hydrogen within storage tank 20 to be selectively supplied to fuel cell system 36 for consumption therein.

Cooling shield 24, as stated above, surrounds a portion of inner tank 22 and vent line 26 spirals around and is in direct contact with cooling shield 24. Cooling shield 24 is used to reduce the radiation heat influx into inner tank 22. That is, as radiation heat influx enters inner tank 22, the temperature of the hydrogen within inner tank 22 will increase. The increase in the temperature of the hydrogen also causes the pressure level within inner tank 22 to increase, as described below. When the pressure within inner tank 22 reaches a predetermined quantity, valve 28 opens to vent hydrogen from inner tank 22 so that the pressure in inner tank 22 does not exceed the predetermined level. As shown in FIG. 1B, the hydrogen that is vented from inner tank 22 due to the opening of vent valve 28 flows through vent line 26 and around cooling shield 24. The extremely low temperature of the hydrogen flowing through vent line 26 cools cooling shield 24 and reduces the radiation heat influx into inner tank 22. That is, hydrogen vented through vent line 26 flows around cooling shield 24 and around an exterior of inner tank 22 prior to exiting storage tank 20. Cooling shield 24 acts as a heat exchanger and as the hydrogen flows through vent line 26, the hydrogen will heat up and the cooling shield will cool down and help reduce the radiation heat influx into inner tank 22. Vent line 26 can be designed to flow around cooling shield 26 in a variety of manners. For example, vent line 26 can be configured so that the hydrogen flow path spirals around cooling shield 24, as shown, or takes a serpentine path around cooling shield 24 (not shown). Cooling shield 24 is made from material having a high thermal conductivity, such as cooper and aluminum.

Vent line 26 can be attached to inner tank 22 in a variety of locations. For example, as shown in FIG. 1A, vent line 26 is attached to a side of inner tank 22 that corresponds to approximately a 95% liquid level of inner tank 22. In other words, vent line 26 is attached to inner tank 22 at a location that corresponds to the approximately 95% capacity level of inner tank 22. Alternatively, as shown in hidden lines in FIG. 1A, vent line 26 can be attached to a top of inner tank 22 so that vent line 26 is at the approximately 100% capacity level of inner tank 22. The location of vent line 26 can effect the state of hydrogen that is vented from inner tank 22. That is, the hydrogen vented from inner tank 22 may be in a liquid form or a gaseous form depending upon the liquid level within inner tank 22 and the location at which vent line 26 is attached to inner tank 22 as described below.

The above described description of the multi-layered vacuum super insulated cryogenic liquid gas storage tank 20 is for exemplary purposes only to enable an understanding of the methods disclosed in the present invention. Accordingly, deviations and variations in the specific configuration of storage tank 20 can be employed without departing from the scope of the present invention. For example, storage tank 20 can be made of differing materials, have differing levels or types of insulation 30, can incorporate differing types of cooling shields 24 and the like. Additionally, it should be appreciated that storage tank 20, while shown as being generally cylindrical, can take a variety of other shapes such as non-cylindrical and asymmetrical configurations.

Currently, storage tanks 20 on stationary and mobile platforms are being operated in a manner that avoids the venting of hydrogen in a liquid state from inner tank 22. The avoidance of venting hydrogen in a liquid state has drawbacks in how storage tank 20 is operated. Specifically, the avoiding of venting liquid hydrogen limits the pressure and temperature at which storage tank 20 is operated to maintain the hydrogen in a two-phase state of liquid and gas with a gas bubble on the top portion of inner tank 22 so that when valve 28 opens hydrogen in a gaseous form flows through vent line 26. Additionally, the avoidance of venting liquid hydrogen also limits the quantity of hydrogen that can be placed in inner tank 22. That is, the quantity of liquid hydrogen that can be placed in inner tank 22 when filling up inner tank 22 is limited so that when valve 28 opens, the liquid level within inner tank 22 is below the level at which vent line 26 is attached to inner tank 22. For example, when vent line 26 is located at approximately the 95% capacity level on inner tank 22, the initial filling of inner tank 22 with hydrogen is limited to a liquid level of about 80–85% at the typical temperatures at which storage tank 20 is designed to be operated. This limitation on the level of liquid hydrogen that can be placed in inner tank 22 reduces the overall capacity of storage tank 20 to less than the theoretical capacity of 100% full of liquid hydrogen. Examples of typical operation of a cryogenic liquid gas storage tank 20 without a cooling shield 24 without venting liquid hydrogen is shown in example 1 and with venting of liquid hydrogen is shown in example 2.

EXAMPLE 1

Figure 2A:
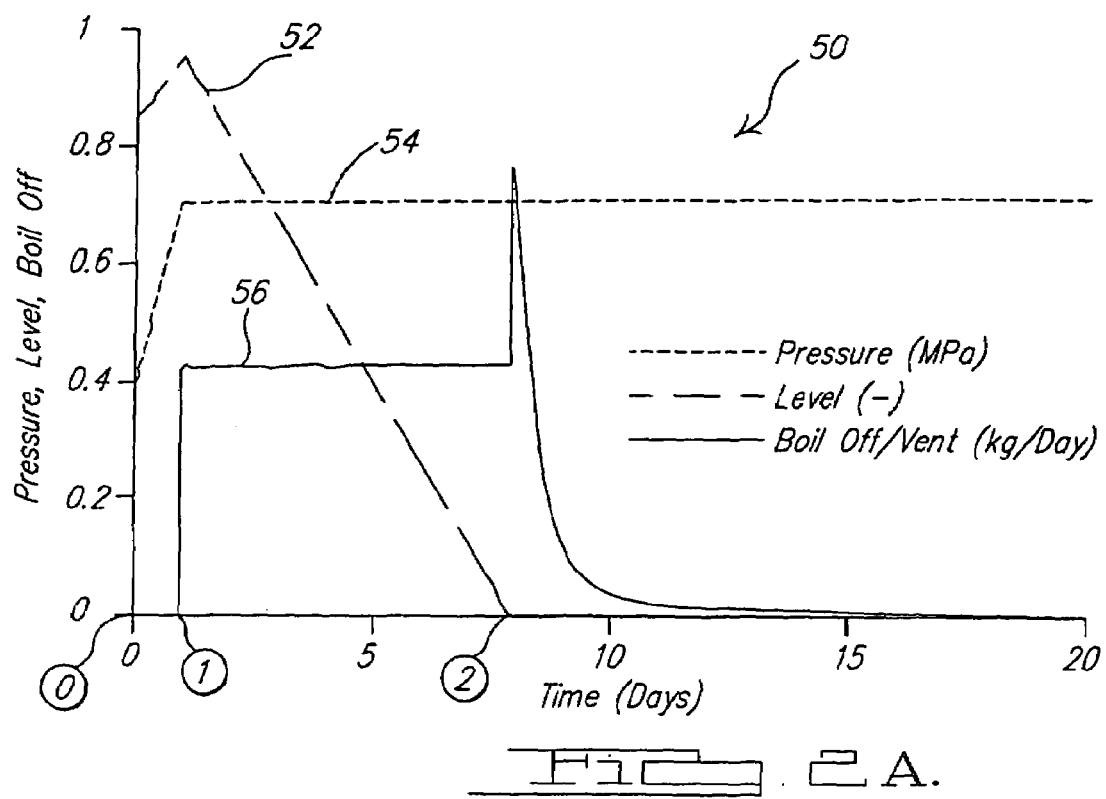
FIG. 2A is a diagram of a typical prior art operation of a pressurized cryogenic liquid gas storage tank when storing hydrogen.
Figure 2B:
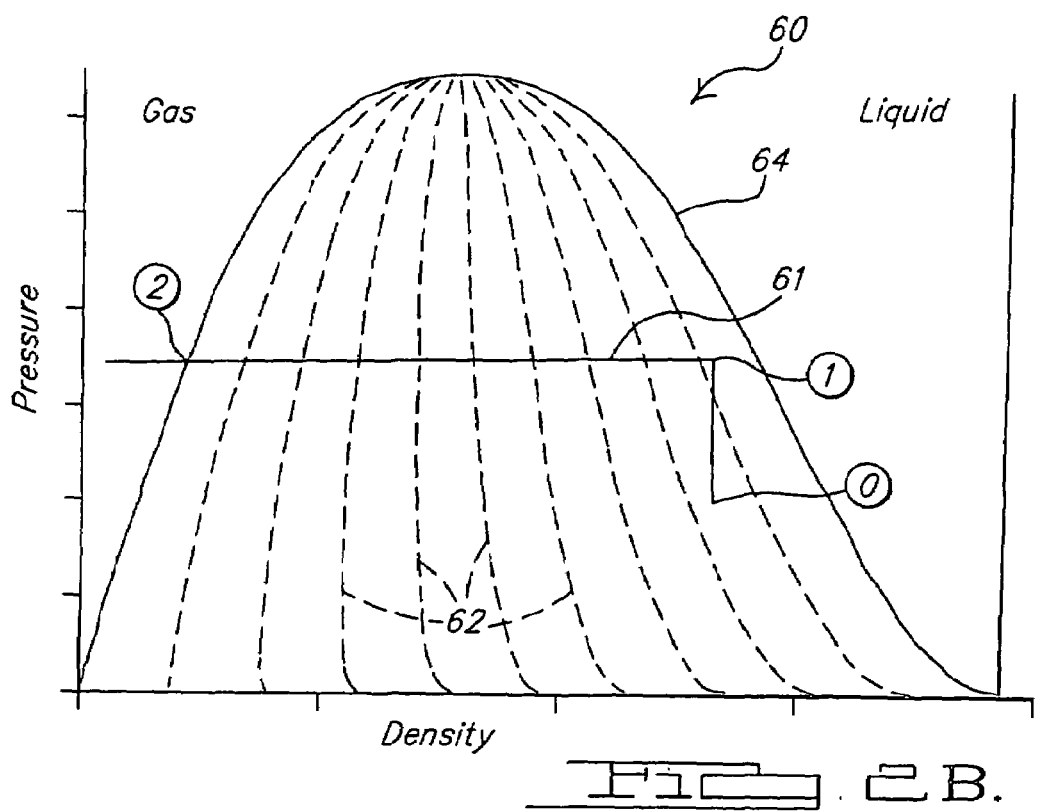
FIG. 2B is a phase diagram of the state of the hydrogen fuel in the storage tank corresponding to the operation shown in FIG. 2A.

FIGS. 2A and B show an example of a typical operation of a cryogenic liquid gas storage tank without a cooling shield and with the vent line being at a 95% capacity level of the storage tank. In example 1, liquid hydrogen is not vented from the storage tank. Graph 50 shows the pressure, liquid level and venting or boil off rate of hydrogen in the storage tank over a period of days. Venting rate and boil off rate as used herein are equivalent and both refer to the rate at which hydrogen flows through the vent line. Line 52 represents the volumetric liquid level of hydrogen in storage tank 20 as a percentage. Line 54 represents the pressure level in inner tank 22 in MPa. Line 56 represents the venting or boil off rate of hydrogen being vented from inner tank 22 in kg/day. Graph 60 (FIG. 2B) is a phase diagram of the hydrogen within inner tank 22. Line 61 represents the physical state of the hydrogen corresponding to the operation shown in FIG. 2A. Lines 62 represent lines of constant volumetric liquid level for the hydrogen when within dome 64. The far left area of graph 60 outside of dome 64 represents hydrogen in an entirely gaseous state while the far right side of graph 60 outside of dome 64 represents hydrogen being in an entirely liquid state. Dome 64 represents saturated gas and saturated liquid respectively.

In this example, the storing of hydrogen within the storage tank over a period of time is shown. Initially, the storage tank is filled with hydrogen so that the liquid level within inner tank 22 is approximately 85% of the capacity of inner tank 22 while the remaining 15% of the capacity of inner tank 22 contains hydrogen in a gaseous state. The initial pressure of hydrogen within the storage tank is about 0.4 MPa and hydrogen is not being vented from the storage tank due to the pressure level within the storage tank not being at the predetermined level to cause the vent valve to open. This initial state is indicated as state 0 in graphs 50, 60. The heat influx over time into the inner tank causes the temperature of the hydrogen to increase which in turn causes the pressure within the inner tank to increase as indicated by pressure level line 54. Simultaneously, the level of liquid hydrogen within the storage tank also increases as indicated by liquid level line 52 because the liquid hydrogen expands with increasing temperature. The pressure within the storage tank continues to rise until the pressure reaches the predetermined venting or boil off pressure wherein the vent valve opens, in this case at approximately 0.7 MPa and is indicated as state 1 in graphs 50, 60. The liquid level of the hydrogen at state 1 is just under 95%, as can be seen in phase diagram 60. At state 1, when the vent valve opens, gaseous hydrogen starts to be vented or boiled off from the storage tank, as indicated by vent rate line 56. While the storage tank is venting gaseous hydrogen the pressure level within the storage tank remains substantially constant while the liquid level of hydrogen in the inner tank continues to drop. After a sufficient period of time, all off the liquid hydrogen within the storage tank is flashed off to a gaseous state and the tank becomes entirely empty of liquid hydrogen, which is indicated as state 2 in graphs 50, 60. At the moment the last of the liquid hydrogen is flashed off into gaseous hydrogen, a spike in the venting rate of hydrogen occurs due to the continuing heat influx going entirely to heating the gaseous hydrogen as opposed to only a portion of the heat influx going to heat the gaseous hydrogen while the majority of it was going to evaporate the liquid hydrogen within the storage tank. In other words, the heat of vaporization is no longer present and all the heat going into the storage tank will go toward increasing the temperature of the hydrogen gas instead of evaporating the hydrogen liquid. Therefore, due to the sudden absence of the heat of evaporation, a spike in the rate of venting of hydrogen from the storage tank occurs. After state 2, the venting rate of hydrogen from the storage tank decays very rapidly as the gas heats up more quickly from the heat influx and is vented from the storage tank. Eventually, the rate of hydrogen being vented from the storage tank drops to about zero and the quantity of hydrogen within the storage tank is essentially zero.

Thus, in example 1 the storage tank is filled to approximately 85% with liquid hydrogen and as heat enters into the hydrogen, the pressure within the storage tank will increase until reaching a level at which the vent valve opens. At this time, the hydrogen is still in a two-phase state and gaseous hydrogen begins venting from the storage tank. The venting of hydrogen continues until all of the liquid hydrogen has flashed off or evaporated into gaseous hydrogen at which time there is a spike in the rate of hydrogen being vented from the storage tank. The rate of venting quickly decays and the tank is essentially out of hydrogen within a period of approximately 10–11 days.

EXAMPLE 2

Figure 3C:
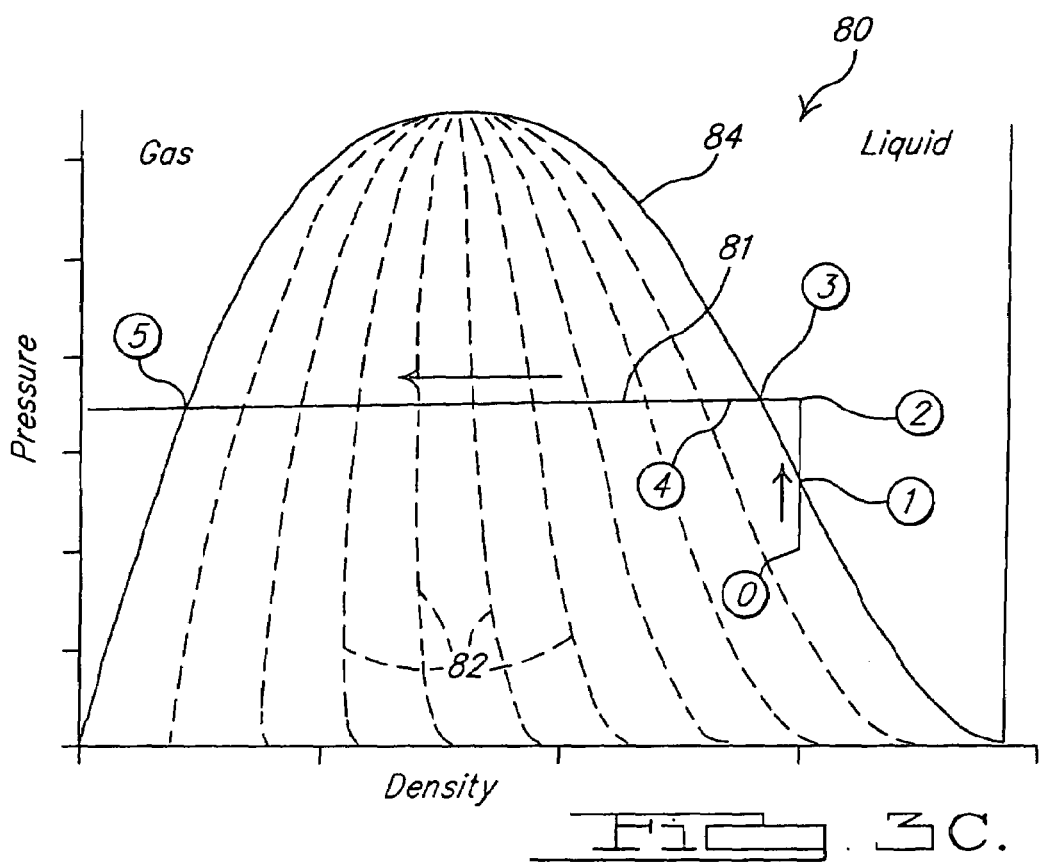
FIG. 3C is a phase diagram of the state of the hydrogen fuel in the storage tank corresponding to the operation shown in FIG. 3A.

Referring now to FIGS. 3A–C, a second example of hydrogen storage is shown. In this example, hydrogen is stored in a storage tank that does not have a cooling shield, the vent line is located at the 95% capacity level and the storage tank is operated such that liquid hydrogen is vented from the storage tank for a period of time. Graph 70 (FIGS. 3A and B) shows the pressure level in the storage tank, the level of liquid hydrogen in the storage tank, and the venting or boil off rate of hydrogen from the storage tank as a function of time. Line 72 represents the volumetric level of liquid hydrogen within the storage tank as a percent of the capacity of the storage tank. Line 74 represents the pressure level within the storage tank in MPa. Line 76 represents the venting or boil off rate of hydrogen from the storage tank in kg/day. Graph 80 (FIG. 3C) is a phase diagram with line 81 showing the state of the hydrogen at various stages corresponding to operation of the storage tank. Lines 82 represent constant volumetric liquid level of the hydrogen within dome line 84. The region to the far left of graph 80 outside of dome 84 represents the hydrogen being in an entirely gaseous state while the region in graph 80 on the far right outside of dome 84 represents the hydrogen in an entirely liquid state. Dome 64 represents saturated gas and saturated liquid respectively.

In this example, the storage tank is initially filled with hydrogen so that the liquid level of hydrogen is approximately 95% of the capacity of the storage tank, an overfilled condition, as represented by line 72 at state 0. The hydrogen is added to the storage tank at a pressure of approximately 0.4 MPa and the venting rate is zero because the vent valve is currently closed as the predetermined pressure within the inner tank has not been reached.

As heat influx enters into the storage tank, the temperature of the hydrogen increases which also causes the pressure within the storage tank to increase and quickly reaches the point where the hydrogen transitions from a two-phase state of gas and liquid to a single-phase state of liquid, as indicated at state 1. This happens very quickly in this example because the hydrogen level within the storage tank began at a 95% of the capacity of the tank which is an overfilled condition for typical prior art operation of the storage tank. Because the hydrogen has now assumed an entirely single-phase state of liquid, the liquid can no longer expand due to further heat influx into the storage tank while compressing and condensing gaseous hydrogen. As a result, the rate at which the pressure is increasing within the storage tanks increases as indicated by the change of slope of pressure level line 74 on either side of state 1. This increase is due to the absence of a gas buffer allowing the liquid to expand freely and, therefore, the pressure level within the storage tank rises more quickly once the hydrogen changes from a two-phase state of gas and liquid to a single-phase state of liquid. The pressure in the storage tank continues to rise until the pressure reaches the predetermined level at which time the vent valve opens as indicated as state 2 in graphs 70, 80. In this example, the vent valve opens at approximately 0.7 MPa as indicated by pressure line 74 at state 2.

Because the hydrogen within the storage tank is in a single-phase state of liquid, the opening of the vent valve causes liquid hydrogen to travel through the vent line and exit the storage tank. The venting rate of the liquid hydrogen is substantially constant and approximately the same rate as when venting pure gas in example 1 between states 1 and 2. The venting of hydrogen at this rate continues until the hydrogen reenters or transitions back into a two-phase state of liquid and gas as indicated at state 3 in graphs 70, 80. As the hydrogen enters the two-phase state of liquid and gas, gaseous hydrogen begins to form at the top of the storage tank. The rate of venting at this point takes a considerable jump due to the venting of liquid hydrogen, as indicated by venting rate line 76 at state 3. As can be seen on the expanded portion of graph 70 in FIG. 3B, the venting rate of the hydrogen continues at this high level until a sufficient amount of hydrogen in the storage tank has evaporated into the gaseous state such that the vent line begins to vent gaseous hydrogen instead of liquid hydrogen. In other words, this high rate of venting continues to occur until the liquid level of the hydrogen is below the location in the storage tank of the inlet to the vent line. In this example, the vent rate reaches a peak of approximately 2.7 kg/day and lasts for approximately 90 minutes as represented by state 4 in graphs 70, 80. Thus, between states 3 and 4 gaseous hydrogen is forming within the storage tank and as the gas continues to form it pushes the liquid hydrogen out of the tank through the vent line.

Once the liquid level of hydrogen drops below the 95% level in the storage tank (the vent line location), the venting of the hydrogen returns to a more normal state similar to that shown in example 1 wherein the hydrogen vents at a rate of approximately 0.42 kg/day. This continues until all the liquid hydrogen has flashed off or evaporated into gaseous hydrogen as indicated at state 5 in graphs 70, 80. At this time, just as occurred in example one, there is a spike in the vent rate of the hydrogen from the storage tank as a result of the heat influx going entirely to heat the gaseous hydrogen as opposed to the heat of vaporization of liquid hydrogen occurring just prior to reaching state 5. After state 5, the venting rate decays quickly and is substantially the same as that shown in example 1 following the occurrence of state 2.

Thus, in example 2 when the storage tank is over filled with liquid hydrogen to the approximately 95% level and no cooling shield is used, pressure in the storage tank increases due to heat influx and the hydrogen transitions from a two-phase state of gas and liquid to a single-phase state of liquid only. This transition results in a large peak venting rate occurring during the venting of the hydrogen when the hydrogen transitions back from the single-phase state of liquid to a two-phase state of liquid and gas. With the peak venting rate in example 2 being significantly larger than the peak venting rate in example 1, the level of hydrogen in the storage tank decreases more quickly and reaches a substantially zero level sooner than that in example 1 wherein no liquid venting occurs and the hydrogen never enters a single-phase state of liquid. Additionally, more hydrogen is lost due to the initial quantity of hydrogen in the storage tank being greater than that in example 1. Thus, the allowance of the hydrogen within the storage tank to transition from a two-phase state of liquid and gas to a single-phase state of liquid increases the overall effective venting rate of the hydrogen from the storage tank and results in an increase in lost energy. In addition, the pressure relief valve 28 must be able to sustain, operate correctly and be certified for liquid hydrogen conditions. The large peak in the boil off rate would probably also cause problems for a boil off management system that is designed for a regular boil off rate and could not handle the peak.

EXAMPLE 3

Figure 4C:
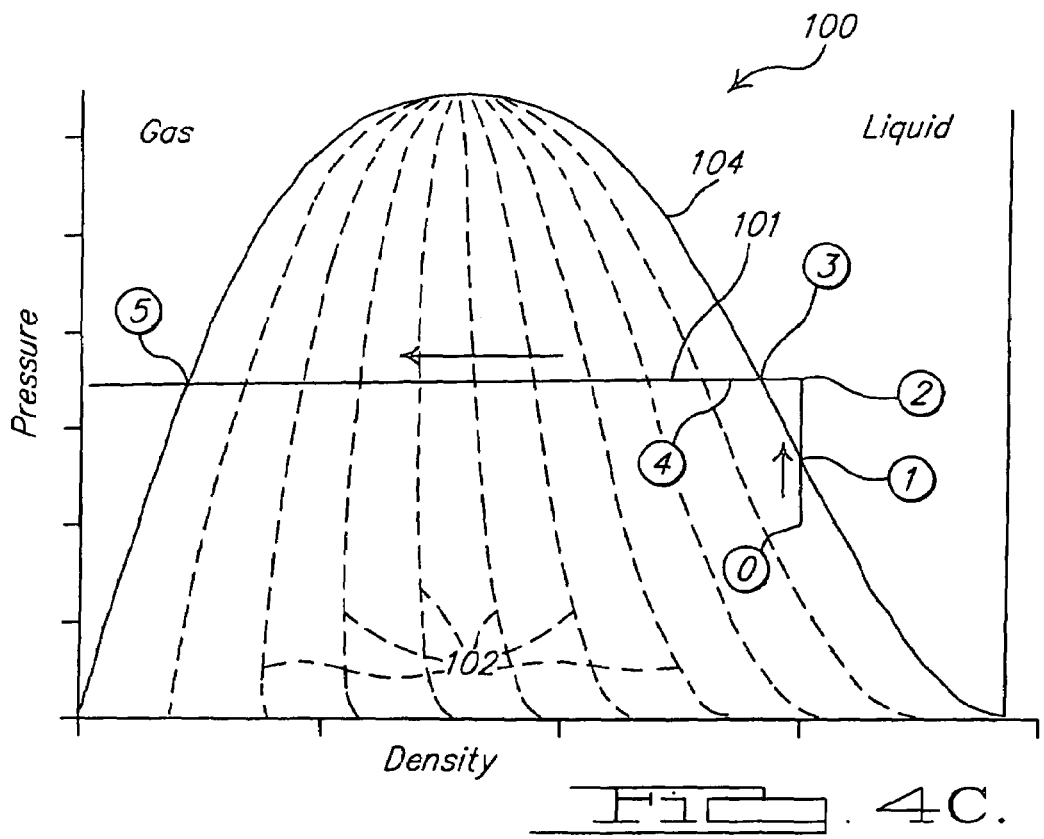
FIG. 4C is a phase diagram of the state of the hydrogen fuel in the storage tank corresponding to the operation shown in FIG. 4A.

Referring now to FIGS. 4A–C, a method according to the principles of the present invention for operating a storage tank is shown. In this example, the storage tank is substantially the same as that used in examples 1 and 2 with the addition of a cooling shield around which the hydrogen being vented from the inner tank flows prior to exiting the outer tank. The use of a cooling shield, as described below, provides a significant advantage and reduces the overall or effective venting rate of hydrogen such that the duration the hydrogen remains in the storage tank is substantially increased. The use of a boil off cooling shield furthermore greatly reduces the large boil off peak in example 2 between states 3 and 4.

Graph 90 in FIGS. 4A and B represents the pressure level in the inner tank, the level of liquid hydrogen within the tank and the venting rate of the hydrogen from the tank as functions of time. Specifically, line 92 represents the volumetric level of liquid hydrogen within the tank as a percentage of the tank capacity. Line 94 represents the pressure level in the inner tank in MPa. Line 96 represents the venting or boil off rate of hydrogen from the storage tank in kg/day. Graph 100, shown in FIG. 4C, is a phase diagram with line 101 representing the state of the hydrogen corresponding to the operation of the storage tank. Lines 102 within dome 104 of the phase diagram represent lines of constant volumetric liquid level of the hydrogen. The far left side of graph 100 outside of dome 104 represents the region wherein the hydrogen exists in a single-phase state of gas while the far right-hand side of graph 100 outside of dome 104 represent a region in which the hydrogen is in a single-phase state of liquid. Dome 64 represents saturated gas and saturated liquid respectively.

In this example, the storage tank is initially filled with hydrogen so that the liquid level of hydrogen is approximately 95% of the capacity of the storage tank, as indicated by liquid level line 92 at state 0. The initial pressure level in the storage tank also begins at approximately 0.4 MPa, as represented by pressure level line 94 at state 0. As the heat influx enters into the inner tank, the temperature of the hydrogen begins to increase and, as a result, the pressure in the storage tank also increases. When the hydrogen within the storage tank increases to a sufficient pressure, as represented at state 1, the hydrogen transitions from a two-phase state of liquid and gas to a single-phase state of liquid. As the heat continues to flow into the inner tank, the temperature and pressure of the hydrogen continues to increase until the pressure reaches the predetermined level wherein the vent valve opens to begin venting hydrogen through the vent line, as indicated at state 2. Again, the predetermined pressure is approximately 0.7 MPa as represented by pressure level line 94 at state 2. With the predetermined pressure level being reached and the vent valve opening, liquid hydrogen begins being vented from inner tank 22 and flows around cooling shield 24 prior to exiting outer tank 32. Because the venting hydrogen flows around a cooling shield, there is a first spike in the venting rate, as indicated by venting rate line 96 at state 2. This first spike reaches up to approximately 0.38 kg/day rate and rapidly decreases to below about 0.19 kg/day rate. The initial spike of about 0.38 kg/day is about the same as the initial venting rate of liquid hydrogen in Examples 1 and 2. The venting level in Example 3, however, quickly decreases to about 0.19 kg/day which is approximately half of the rate of the venting that occurs in Examples 1 and 2. The rapid decrease is a direct result of the liquid hydrogen flowing around the cooling shield. The flow of liquid hydrogen around the cooling shield provides a reduction in the heat influx into the inner tank and, as a result, a lower rate of venting of hydrogen from the storage tank occurs. The venting of liquid hydrogen from the storage tank continues to occur at substantially this rate until the hydrogen transitions from a single-phase state of liquid to a two-phase state of liquid and hydrogen, as indicated at state 3 in graphs 90, 100. The vented liquid hydrogen is evaporated in the boil off cooling shield such that it passes through outer tank 32 in a warm gaseous state, not a cryogenic liquid state.

As the hydrogen transitions from being in a single-phase state of liquid to a two-state of liquid and gas, a spike in the venting rate of hydrogen from the storage tank occurs, as indicated by venting rate line 96 at state 3. The use of cooling shield 24, however, causes the venting rate to decrease rapidly and reduces the peak venting rate to approximately 1 kg/day. This venting rate then decreases very rapidly to a lower rate which remains substantially constant as liquid hydrogen is continued to be vented from the storage tank until state 4 is achieved. Again, the vented liquid hydrogen is evaporated in the boil off cooling shield such that it passes through the outer tank 32 in a warm gaseous state, not in a cryogenic liquid state. At state 4, the level of hydrogen gas within the storage tank has increased to a sufficient amount to cause the inlet to the vent line to be above the liquid hydrogen level and a venting of gaseous hydrogen occurs instead of a venting of liquid hydrogen. Upon reaching state 4, the venting rate of hydrogen drops and, due to the presence of the cooling shield, experiences a brief downward spike which rapidly increases to a new steady state rate of venting, as indicated by venting rate line 96 just past state 4. The rapid increase in the venting rate of hydrogen from the storage tank immediately following the negative spike is a result of the gaseous hydrogen flowing through the cooling shield instead of liquid hydrogen. That is, the gaseous hydrogen does not have as great a cooling effect on the cooling shield and, as a result, the cooling shield has a lesser effect on the heat influx into the inner tank when gaseous hydrogen is flowing through the vent line. The venting rate of hydrogen quickly establishes a new steady state rate of just over 0.2 kg/day until the hydrogen reaches state 5 which corresponds to the hydrogen transitioning from a two-phase state of liquid and gas to a single-phase state of gas. This steady state venting rate is approximately one-half the steady state rate between states 4 and 5 in Example 2 and between states 1 and 3 in Example 1.

When the hydrogen in the storage tank transitions from the two-phase state of liquid and gas to the single-phase state of gas the venting rate experiences a brief spike which then decays, as indicated by venting rate line 96 at state 5 and immediately thereafter. The rate of venting of hydrogen from the storage tank continues to decrease until essentially no hydrogen is left which occurs sometime after 20 days have elapsed, as indicated by venting rate line 96.

Thus, in Example 3 the use of a cooling shield provides significant improvement in the venting rate of hydrogen from a storage tank. Specifically, the use of the cooling shield results in smaller spikes or peaks of venting and for quicker decays in the rate of the venting of hydrogen. Additionally, the use of a cooling shield also reduces the steady state venting rates to approximately one-half of those without the use of the cooling shield. Thus, with the use of a cooling shield hydrogen can remain stored in the storage tank for a longer duration of time than without the use of a cooling shield. The use of a cooling shield also allows the filling of the tank with hydrogen at a level of 95% or more of the capacity of the tank while still providing the reduced venting rate of hydrogen from the storage tank. Accordingly, the use of a cooling shield allows for a greater quantity of hydrogen to be stored safely in a storage tank of a given volume and decreases the rate at which the hydrogen is vented from the storage tank to maintain the pressure level within the storage tank at or below a predetermined pressure level.

Examples 1–3 all demonstrate the operating of storage tank 20 to store hydrogen when none of the hydrogen within the tank is being consumed by the mobile platform 34 on which storage tank 20 is used. If mobile platform 34 is operated such that fuel cell system 36 receives hydrogen from storage tank 20, the operation of storage tank 20 when storing hydrogen will change. That is, the consumption of hydrogen by mobile platform 34 from storage tank 20 will cause the pressure level within storage tank 20 to drop to an operational level which is below the venting level. As a result, the hydrogen within storage tank 20 may transition from a two-phase state of liquid and gas to a single-phase state of liquid and vary back and forth therebetween multiple times depending upon the operation of mobile platform 34.

For example, referring now to FIG. 5, a graph 110 shows the phase diagram for the hydrogen during various operating conditions of storage tank 20 and mobile platform 34 when being operated according to the principle of the present invention. Line 111 represents the state of the hydrogen within storage tank 20. Lines 112 within dome 114 represents lines of constant volumetric liquid level. The far left side of graph 110 outside of dome 114 represent the region wherein the hydrogen is in a single-phase state of gas while the area on the far right-hand side of graph 110 outside of dome 114 represents the region wherein the hydrogen is in a single-phase state of liquid. In this scenario, the hydrogen is at an initial level of approximately 98% liquid and 2% gas within storage tank 20, as indicated at state 1. Mobile platform 34 is not consuming any hydrogen from storage tank 20 at this time. As heat influx enters into inner tank 22, the temperature of the hydrogen increases and, as a result, the pressure in inner tank 22 also increases. The temperature and pressure within inner tank 22 continue to increase until the predetermined venting pressure is reached at state 2 and vent valve 28 opens to release hydrogen through vent line 26. When vent valve 28 opens, hydrogen in inner tank 22 is in a single-phase state of liquid and liquid hydrogen is vented through vent line 26 and around cooling shield 24. As the venting continues, the quantity of hydrogen within storage tank 20 decreases and, as a result, the density of the hydrogen within storage tank 20 decreases. The density of the hydrogen within storage tank 20 continues to decrease and then, in this example, at state 3 mobile platform 34 is operated and hydrogen is delivered from storage tank 20 to fuel cell system 36 where it is consumed therein to produce electrical power. The supplying of hydrogen from storage tank 20 to fuel cell system 36 causes the pressure within inner tank 22 to decrease and approach the operating pressure level. As the pressure decreases, the hydrogen transitions from a single-phase state of liquid to a two-phase state of liquid and gas, as indicated by line 111 at state 4. As mobile platform 34 is continued to be operated and hydrogen from storage tank 20 is consumed, the level of liquid hydrogen within storage tank 20 continues to decrease while the level of gaseous hydrogen in storage tanks 20 increases. Eventually, the operation of mobile platform 34 causes the pressure level within storage tank 20 to decrease to the operating pressure as indicated by line 111 at state 5. The continued consumption in combination with controlled heating of the cryogenic hydrogen by mobile platform 34 from storage tank 20 causes the pressure level to remain substantially constant at the operating pressure level while the quantity of liquid hydrogen within storage tank 20 decreases and the quantity of gaseous hydrogen within storage tank 20 increases, as indicated by line 111 between states 5 and 6.

Eventually, the operation of mobile platform 34 ceases and the consumption of hydrogen from storage tank 20 also ceases, as indicated by line 111 at state 6. With the consumption of hydrogen from storage tank 20 ceased, the heat influx into storage tank 20 causes the temperature and, as a result, the pressure within storage tank 20 to increase, as previously described. Depending upon the predetermined venting pressure of storage tank 20 and the liquid and gaseous composition of the hydrogen within storage tank 20 at the time mobile platform 34 ceases to consume hydrogen from storage tanks 20, the hydrogen may transition from the two-phase state of liquid and gas to the single-phase state of liquid again, as indicated by line 111 at state 7. If mobile platform 34 continues to not consume any hydrogen from storage tank 20, the hydrogen will be vented from storage tank 20, as described above, and transitioned back to a two-phase state of liquid and gas followed by subsequent transition to a single-phase state of gas as indicated by line 111 at states 8 and 9. It should be appreciated that the hydrogen in storage tank 20 can transition from the two-phase state of gas and liquid to a single-phase state of liquid and back and forth therebetween multiple times prior to reaching a level at which the hydrogen will no longer continue to transition to a single-phase state of liquid due to the reduced quantity of hydrogen within storage tank 20 regardless of the operation of mobile platform 34.

Thus, a fuel storage tank having a cooling shield can be operated according to the principles of the present invention in a manner that allows hydrogen to transition from a two-phase state of gas and liquid to a single-phase state of liquid and back and forth therebetween. Additionally, the use of the cooling shield enables the filling of the tank with liquid hydrogen above 95% of the tank capacity and even up to 100% of the tank capacity while reducing the rate at which the hydrogen is vented from the storage tank when hydrogen is not being consumed by the mobile platform 34. The reduced venting rate also extends the length of time for which a given quantity of hydrogen remains in storage tank 20 before being entirely vented from storage tank 20.

It should be appreciated that while the methods of the present invention have been described with reference to a specific storage tank, other storage tanks having similar characteristics and employing a cooling shield can also be utilized to practice the methods. Additionally, it should be appreciated that the representative operation of storage tank 20 assumes thermodynamic equilibrium between the liquid hydrogen and gaseous hydrogen and that actual results may deviate from those shown. The assumption of thermodynamic equilibrium means that the gas and liquid temperature and pressures are assumed to be the same and that during venting 100% of the heat influx into the inner tank goes into evaporation when the hydrogen is in a two-phase state. The assumption of thermodynamic equilibrium, however, provides a close approximation and can be validated by comparing actual experimental results to actual simulations performed. Thus, the description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of operating a system which comprises a pressurized cryogenic storage tank that stores a gaseous fuel in liquid form and inhibits heat influx into the stored fuel and which comprises an apparatus that consumes fuel from the storage tank, the method comprising:
   (a) storing the fuel in the storage tank in a first two-phase gas and liquid state and inhibiting heat influx into the stored fuel;
   (b) transitioning the fuel in the storage tank from said first two-phase state to a single-phase liquid state by heat influx leaking into the storage tank; and
   (c) transitioning the fuel in the storage tank from said single-phase liquid state to a second two-phase gas and liquid state.

2. The method of claim 1, wherein (c) is performed by the apparatus consuming fuel from the storage tank.

3. The method of claim 2, wherein (b) is performed again once the apparatus ceases consuming fuel from the storage tank.

4. The method of claim 2, wherein (b) then (c) then (b) are performed repetitively as the apparatus consumes and ceases to consume fuel from the storage tank.

5. The method of claim 1, wherein (b) further includes controlling a pressure level in the storage tank to increase pressure while the fuel in the storage tank transitions from said first two-phase state to said single-phase state.

6. The method of claim 1, wherein (b) further includes maintaining a quantity of fuel in the storage tank substantially constant while the fuel in the storage tank transitions from said first two-phase state to said single-phase state.

7. The method of claim 1, wherein the storage tank has an outer wall, and a cooling shield inboard of said outer wall and (c) is performed by venting a portion of the liquid fuel from the storage tank in heat transfer relationship with the heat flux leaking in and around the cooling shield.

8. The method of claim 1, wherein (c) further includes maintaining a pressure level in the storage tank substantially constant while transitioning the fuel from said single-phase state to said second two-phase state.

9. The method of claim 1, wherein (c) is performed while the apparatus is not consuming fuel from the storage tank.

10. The method of claim 1, wherein (c) is initiated when a pressure level in the storage tank reaches a predetermined value.

11. The method of claim 1, wherein the apparatus is a mobile platform on which the storage tank is located.

12. The method of claim 11, wherein the mobile platform includes a fuel cell operable to consume the fuel in the storage tank.

13. A method of operating a system which comprises a pressurized cryogenic storage tank for storing hydrogen in liquid form and which has a vent cooling shield and which comprises an apparatus that consumes hydrogen from the storage tank, the method comprising:
   (a) adding hydrogen to the storage tank so that the storage tank is filled with hydrogen in a first two-phase gas and liquid state with a liquid level greater than about 95% of a capacity of the storage tank;
   (b) transitioning the fuel in the storage tank from the first two-phase gas and liquid state to a first single-phase liquid state while maintaining a quantity of hydrogen in the storage tank constant; and
   (c) transitioning the fuel in the storage tank from the first single-phase liquid state to a second two-phase gas and liquid state.

14. The method of claim 13, wherein (c) is performed by the apparatus consuming hydrogen from the storage tank.

15. The method of claim 14, further comprising ceasing the consumption of hydrogen from the storage tank by the apparatus and allowing the hydrogen in the storage tank to transition from the second two-phase gas and liquid state to a second single-phase liquid state as a result of heat influx into the storage tank.

16. The method of claim 15, further comprising controlling a pressure level in the storage tank to increase pressure while the hydrogen in the storage tank is transitioning from the second two-phase gas and liquid state to the second single-phase liquid state.

17. The method of claim 15, further comprising maintaining a quantity of hydrogen in the storage tank substantially constant while the hydrogen is transitioning from the second two-phase gas and liquid state to the second single-phase liquid state.

18. The method of claim 13, wherein the storage tank has an outer wall, and the cooling shield is inboard of the outer wall and (c) is performed by venting a portion of the liquid hydrogen from the storage tank in heat transfer relationship with heat influx into the storage tank and around the cooling shield.

19. The method of claim 13, wherein (c) further includes maintaining a pressure level in the storage tank substantially constant while transitioning the hydrogen from the first single-phase liquid state to the second two-phase pas and liquid state.

20. The method of claim 13, wherein (b) is performed while the apparatus is not consuming fuel from the storage tank.

21. The method of claim 13, wherein (c) is initiated when a pressure level in the storage tank reaches a predetermined value.

22. The method of claim 13, wherein (a) includes adding hydrogen to the storage tank so that the storage tank is filled with liquid hydrogen to about 100% of said capacity of the storage tank.

23. The method of claim 14, wherein the apparatus is a mobile platform on which the storage tank is located.

24. The method of claim 23, wherein the mobile platform includes a fuel cell operable to consume the hydrogen in the storage tank.

25. The method of claim 13, further comprising inhibiting heat influx into the stored fuel.

* * * * *